US012573393B2

(12) United States Patent
Fardig et al.

(10) Patent No.: US 12,573,393 B2
(45) Date of Patent: Mar. 10, 2026

(54) METHOD FOR UTILIZING SPECTRAL ANALYSIS TO IDENTIFY AN UNAUTHORIZED AUDIO COMMAND

(71) Applicant: Lenovo (Singapore) Pte. Ltd., New Tech Park (SG)

(72) Inventors: Matthew Fardig, Boonville, IN (US); Dane Hixson, Eden, UT (US)

(73) Assignee: Lenovo (United States) Inc., Morrisville, NC (US)

( * ) Notice: Subject to any disclaimer, the term of this patent is extended or adjusted under 35 U.S.C. 154(b) by 351 days.

(21) Appl. No.: 18/192,282

(22) Filed: Mar. 29, 2023

(65) Prior Publication Data
US 2024/0331689 A1 Oct. 3, 2024

(51) Int. Cl.
| *G10L 15/22* | (2006.01) |
| *G06N 20/00* | (2019.01) |
| *G10L 15/06* | (2013.01) |
| *G10L 15/30* | (2013.01) |
| *G10L 25/18* | (2013.01) |

(52) U.S. Cl.
CPC .............. *G10L 15/22* (2013.01); *G06N 20/00* (2019.01); *G10L 15/063* (2013.01); *G10L 15/30* (2013.01); *G10L 25/18* (2013.01); *G10L 2015/223* (2013.01)

(58) Field of Classification Search
USPC ............... 704/243, 246, 247, 251, 252, 275
See application file for complete search history.

(56) References Cited

U.S. PATENT DOCUMENTS

| 10,810,854 | B1 * | 10/2020 | Correnti | ............... | G08B 29/186 |
| 2014/0122086 | A1 * | 5/2014 | Kapur | ................... | A63F 13/213 |
| | | | | | 704/E15.001 |
| 2017/0186441 | A1 * | 6/2017 | Wenus | ..................... | H04N 7/15 |
| 2018/0293988 | A1 * | 10/2018 | Huang | .................... | G10L 17/20 |
| 2019/0043507 | A1 * | 2/2019 | Huang | .................... | G10L 17/24 |
| 2021/0174811 | A1 * | 6/2021 | Ebenezer | ............... | H04R 3/005 |
| 2022/0392452 | A1 * | 12/2022 | Gupta | .................... | G06F 21/32 |
| 2022/0392453 | A1 * | 12/2022 | Gupta | .................... | G10L 17/12 |
| 2024/0055012 | A1 * | 2/2024 | Wang | .................. | G10L 21/0232 |
| 2024/0256600 | A1 * | 8/2024 | Ng | ........................ | G06F 16/638 |
| 2024/0311474 | A1 * | 9/2024 | Gaubitch | ............... | G10L 17/26 |

* cited by examiner

*Primary Examiner* — Leonard Saint-Cyr
(74) *Attorney, Agent, or Firm* — Kunzler Needham & Hilton

(57) ABSTRACT
A method, apparatus, and computer program product for protecting electronic devices from obstructed voice commands. The method includes receiving, by an electronic device, an audio command and identifying the audio command as a sensitive command. The electronic device performs a spectral analysis of the sensitive command. The spectral analysis is processed, via a learning model, to determine whether the sensitive command is obstructed. The method determines, in response to the sensitive command being obstructed, that the sensitive command is unauthorized and initiates at least one remediation action.

20 Claims, 12 Drawing Sheets

200

202

206    102    208

204

400

404

402

500

404

402

600

900

METHOD FOR UTILIZING SPECTRAL ANALYSIS TO IDENTIFY AN UNAUTHORIZED AUDIO COMMAND

FIELD

The subject matter disclosed herein relates to security protocols for electronic devices and more particularly relates to computer security protocols for protecting electronic devices from obstructed voice commands.

BACKGROUND

Electronic devices, such as smart home devices, commonly provide home automation by integrating various applications configured to monitor and/or control various home features and equipment such as lighting, climate, entertainment systems, appliances, and the like. Applications for home security components such as access control devices, cameras, and/or alarm systems, may also be integrated and controlled by the smart home device. Typically, electronic devices such as smart home devices provide a user interface configured to respond to various types of user input, including voice input, to control the integrated applications. While voice control provides increased ease of operation and control for homeowners and other authorized users, it also raises concerns regarding home security.

BRIEF SUMMARY

A method, apparatus, and computer program product for protecting electronic devices from obstructed voice commands are disclosed. The method includes receiving, by an electronic device, an audio command and identifying the audio command as a sensitive command. A spectral analysis of the sensitive command is performed and the spectral analysis is processed, via a learning model, to determine whether the sensitive command is obstructed. The method determines, in response to the sensitive command being obstructed, that the sensitive command is unauthorized and initiates at least one remediation action.

According to another aspect of the invention, an apparatus includes at least one processor and at least one memory device coupled to the at least one processor. The at least one memory device includes instructions executable by the at least one processor to cause the apparatus to receive an audio command, identify the audio command as a sensitive command, and perform a spectral analysis of the sensitive command. The instructions are further executable by the at least one processor to cause the apparatus to process, via a learning model, the spectral analysis to determine whether the sensitive command is obstructed. In response to the sensitive command being obstructed, the sensitive command may be determined to be unauthorized. At least one remediation action may then be initiated.

According to a third aspect of the invention, a computer program product includes a non-transitory computer readable storage medium storing code. The code is configured to be executable by a processor to perform operations. The operations include receiving an audio command and identifying the audio command as a sensitive command. The operations further include performing a spectral analysis of the sensitive command. The spectral analysis is processed, via a learning model, to determine whether the sensitive command is obstructed.

In some embodiments, the operations include determining that the sensitive command is unauthorized in response to the spectral analysis being obstructed. The operations further include initiating at least one remediation action.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
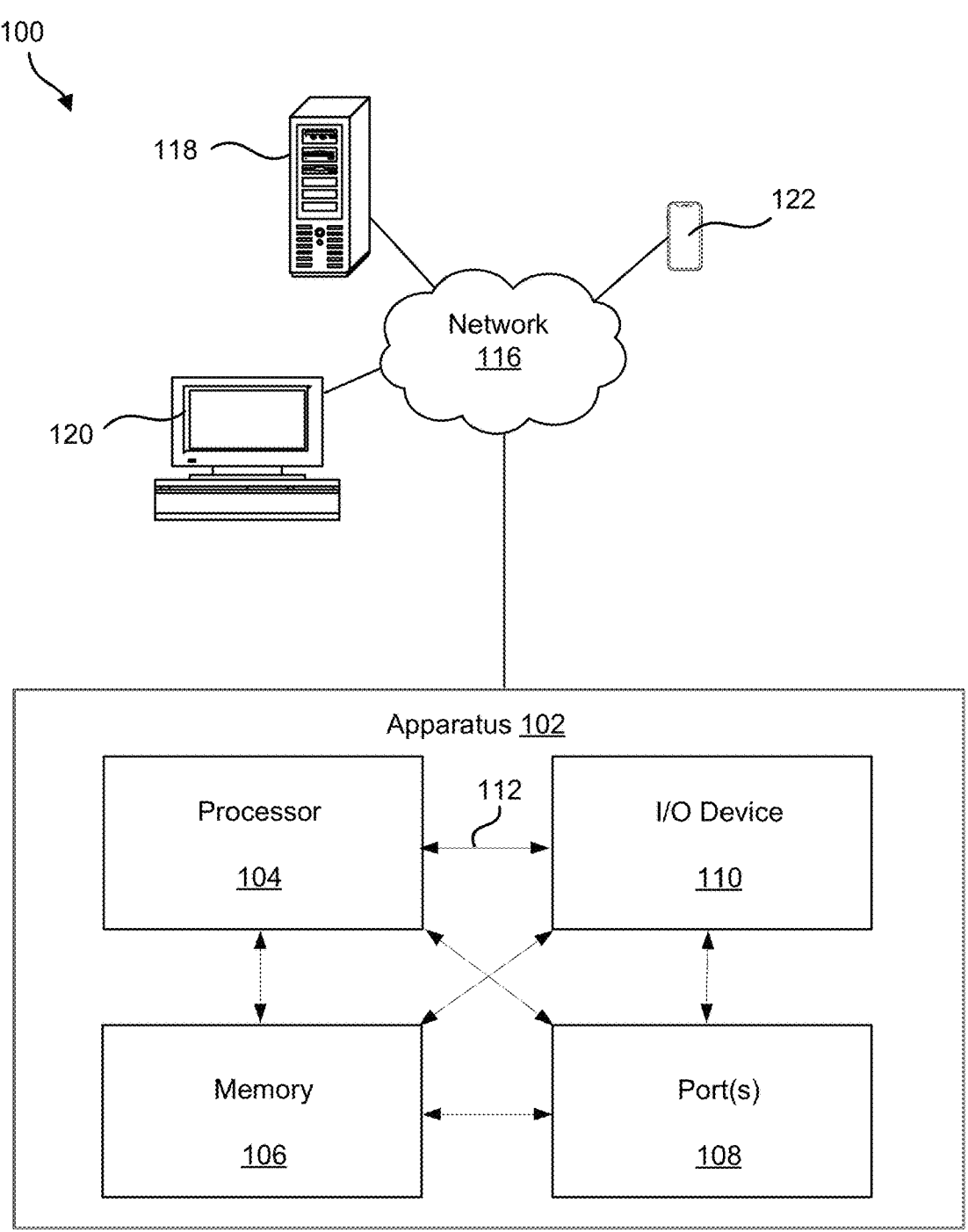
FIG. 1 is an example of a system that supports techniques for protecting electronic devices from unauthorized audio commands in accordance with various embodiments.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/ acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

Home security may be compromised by an unauthorized person utilizing voice control to unlock a door or window, open a garage door, turn on or off an appliance, or the like via a smart home device or other electronic device. Because of this significant risk, voice-controlled electronic devices typically warn that placement of the device is very important to security. Specifically, such devices should be placed away from doors, walls, and windows. Homeowners and other authorized users may further mitigate these risks by setting up voice profiles for authorized users, manually muting the microphone when not needed, and/or requiring authorization or passcodes from each integrated application prior to performing certain operations. These mitigation processes, however, are often cumbersome to implement, difficult to remember, and may limit the number of authorized users. The present disclosure provides a method, apparatus, and computer program product that addresses these and other issues.

As used herein, the term "electronic device" refers to any computing system component or other device configured to receive voice input as commands, e.g., for virtual assistants. The term "home" refers generically to any dwelling, building, structure, garage, shed, shop, apartment, office, or premises having features and/or components controllable by the electronic device. As used herein, the term "exterior environment" refers to any area outside the home, while the term "interior environment" refers to any area inside the home. As used herein, the term "authorized user" refers to any person authorized to control the electronic device. The term "audio command" refers to a voice command from an authorized or unauthorized person, as well as to any audible instruction, query or statement produced by any suitable means. In certain embodiments, the audio command may be voice input for a virtual assistant or other software agent that performs tasks or services based on voice commands, for example, a virtual assistant running on a smartphone or home automation device. The term "learning model" refers to any machine learning program or algorithm used to emulate a logical decision-making process based on available data.

A method, apparatus, and computer program product for protecting electronic devices from obstructed voice commands is disclosed. According to one aspect of the disclosure, the method may include receiving, by an electronic device, an audio command and identifying, by the electronic device, the audio command as a sensitive command. A spectral analysis of the sensitive command may be performed. In some embodiments, the spectral analysis may be processed, via a learning model, to determine whether the sensitive command is obstructed. In some embodiments, the method may include determining, in response to the sensitive command being obstructed, that the sensitive command is unauthorized. In some embodiments, the method may initiate at least one remediation action.

In some embodiments, the method may include configuring learning model to include at least one spectral threshold value corresponding to an obstructed command. In some embodiments, the at least one spectral threshold value corresponds to a resonant frequency of a wall, a door, glass, or a combination thereof. In some embodiments, configuring the learning model may include receiving the spectral threshold value from a remote server. In some embodiments, configuring the learning model may further include generating a threshold score based on the spectral threshold value.

In some embodiments, processing the spectral analysis may include generating a spectral analysis score for the spectral analysis. In one embodiment, processing the spectral analysis may include comparing the spectral analysis score to the threshold score based on the at least one spectral threshold value. In some embodiments, processing the spectral analysis may include applying a filter to the spectral analysis. In some embodiments, determining that the sensitive command is unauthorized may include determining that the spectral analysis score does not satisfy the threshold score.

In some embodiments, determining that the sensitive command is unauthorized may include verifying the sensitive command via at least one of a passcode, a biometric signal, and an electronic signal. In these and other embodiments, initiating the remediation action may include notifying a user, activating a recording device, actuating a light source, actuating a locking mechanism, sounding an alarm, and/or a combination thereof.

According to another aspect of the invention, an apparatus may include at least one processor and at least one memory device coupled to the at least one processor. The at least one memory device may include instructions executable by the at least one processor to cause the apparatus to receive an audio command, identify the audio command as a sensitive command, and perform a spectral analysis of the sensitive command. The instructions may be further executable by the at least one processor to cause the apparatus to process, via a learning model, the spectral analysis to determine whether the sensitive command is obstructed. In response to the sensitive command being obstructed, the sensitive command may be determined to be unauthorized. At least one remediation action may then be initiated.

In some embodiments, the instructions may be further executable by the at least one processor to cause the apparatus to configure the learning model to include at least one spectral threshold value corresponding to an obstructed command. In some embodiments, the spectral threshold value may correspond to a resonant frequency of one or more of a wall, a door, glass, and/or a combination thereof.

In some embodiments, to process the spectral analysis, the instructions may be further executable by the at least one processor to cause the apparatus to generate a spectral analysis score for the spectral analysis. In some embodiments, the instructions may be further executable by the at least one processor to cause the apparatus to compare the spectral analysis score to a threshold score based on at least one spectral threshold value. In these and other embodiments, the instructions may be further executable by the at least one processor to cause the apparatus to automatically receive, from a remote server, at least one spectral threshold value.

In some embodiments, to determine whether the sensitive command is unauthorized, the instructions may be further executable by the at least one processor to cause the apparatus to verify the sensitive command via a passcode, a biometric signal, an electronic signal, and/or a combination thereof.

According to a third aspect of the invention, a computer program product may include a non-transitory computer readable storage medium storing code. The code may be configured to be executable by a processor to perform operations. In some embodiments, the operations may include receiving an audio command and identifying the audio command as a sensitive command. The operations may further include performing a spectral analysis of the sensitive command. The spectral analysis may be processed, via a learning model, to determine whether the sensitive command is obstructed.

In some embodiments, the operations may include determining that the sensitive command is unauthorized in response to the spectral analysis being obstructed. The operations may further include initiating at least one remediation action. In some embodiments, the operations may further include configuring the learning model to include at least one spectral threshold value corresponding to an obstructed command.

Referring now to FIG. 1, one example of a system 100 that supports a method for protecting electronic devices from unauthorized audio commands is illustrated. Those skilled in the art will appreciate that the disclosure, including modules and method steps, may be practiced in computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, various storage devices, and the like. The disclosure, including modules and method steps, may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that embodiments of sensors and/or I/O devices discussed herein may comprise computer hardware, software, firmware, or any combination thereof to perform at least a portion of their functions. For example, an I/O device may include computer code configured to be executed in one or more processors and may include hardware logic/electrical circuitry controlled by the computer code. These example devices are provided herein purposes of illustration and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

The system 100 of FIG. 1 is presented to show one example of an environment where an apparatus and method in accordance with the invention may be implemented. In some embodiments, the system 100 may include a mobile device 122 such as a cellular phone, smart phone or tablet, a desktop computer or workstation 120, a server 118, or the like. The system 100 shown is presented by way of example and is not intended to be limiting. Indeed, the systems and methods disclosed herein may be applicable to a wide variety of different systems in addition to the system 100 shown. The systems and methods disclosed herein may also potentially be distributed across multiple systems 100.

As shown, the system 100 includes an apparatus 102 or electronic device such as a smart home device. In some embodiments, the apparatus 102 may include at least one processor 104 and, in certain embodiments, may include more than one processor 104. The processor 104 may be operably connected to a memory 106. The memory 106 may include one or more non-volatile storage devices such as hard drives, solid state drives, CD-ROM drives, DVD-ROM drives, tape drives, or the like. The memory 106 may also include non-volatile memory such as a read-only memory (e.g., ROM, EPROM, EEPROM, and/or Flash ROM) or volatile memory such as a random access memory (RAM or operational memory). A bus 112, or plurality of buses 112 may interconnect the processor 104, memory devices 106, input/output ("I/O") devices 110, any other suitable devices, and/or ports 108 to enable data and/or instructions to pass therebetween. In some embodiments, the memory 106 may include instructions executable by the processor 104 to cause the apparatus 102 to receive an audio command from a surrounding environment.

In some embodiments, one or more ports 108 may enable communication with external systems or devices. Such ports 108 may be embodied as wired ports 108 (e.g., Universal Serial Bus ("USB") ports, serial ports, Firewire ports, Small Computer System Interface ("SCSI") ports, parallel ports, etc.) or wireless ports 108 (e.g., Bluetooth, Infrared Data Association ("IrDA"), etc.). The ports 108 may enable communication with one or more input/output ("I/O") devices 110 (e.g., keyboards, mice, touchscreens, cameras, microphones, scanners, storage devices, displays, monitors, speakers, printers, storage devices, etc.). The ports 108 may also enable communication with other systems 100.

In certain embodiments, the system 100 includes a wired or wireless network adapter (not shown) to connect the system 100 to a network 116, such as a LAN, WAN, or the Internet. Such a network 116 may enable the system 100 to connect to one or more servers 118, workstations or personal computers 120, mobile computing devices 122 such as cellular phones, or other devices. The network 116 may also enable the system 100 to connect to another network by way of a router or other device.

Figure 2:
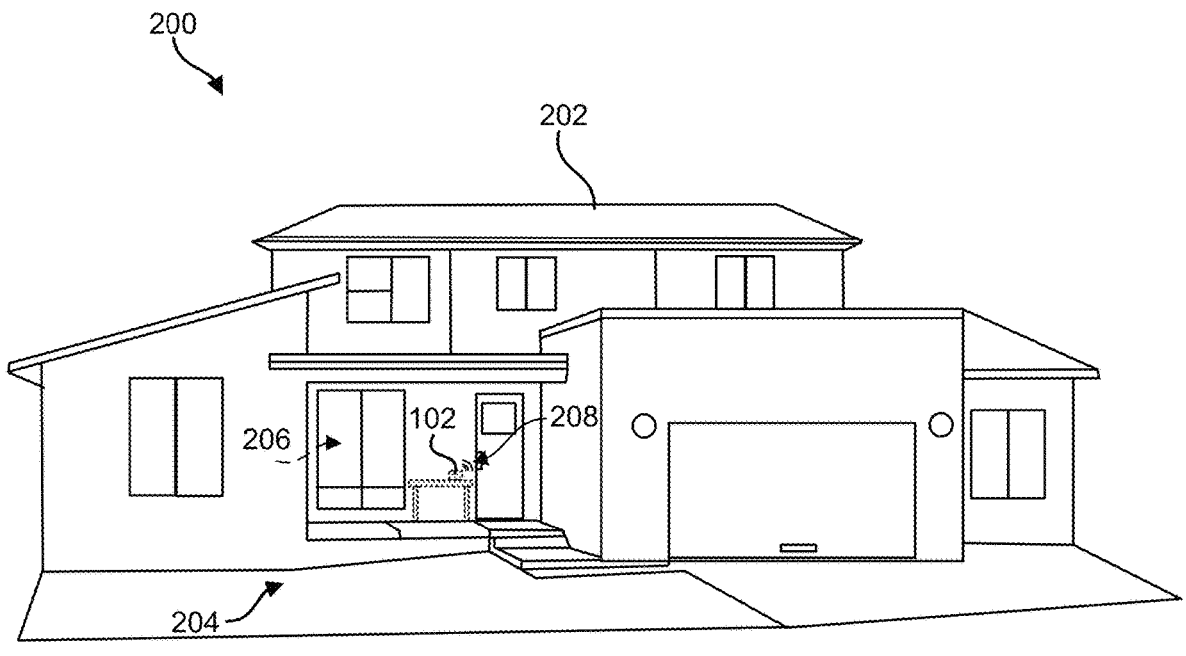
FIG. 2 is an example of an operating environment that supports techniques for protecting electronic devices from unauthorized audio commands in accordance with the disclosure.

Referring now to FIG. 2, in some embodiments, an apparatus 102 for protecting electronic devices from obstructed audio commands may be used in an operating environment 200 including a home 202 such as a dwelling, building, or other suitable structure. In some embodiments, the apparatus 102 may be configured to communicate with at least one other electronic device in the operating environment 200 to control features and/or equipment in and/or surrounding the home 202.

In some embodiments, the apparatus 102 may be situated in an interior environment 206 of the home 202. In some embodiments, the apparatus 102 may be configured to receive one or more audio commands 208 to control features and/or equipment in the operating environment 200. As shown, in some embodiments, the apparatus 102 may be disposed near a window, wall, or door to the home 202. In these and other embodiments, the apparatus 102 may include an I/O device 110 sensitive enough to receive an audio command 208 from an exterior environment 204 of the home 202, thereby rendering the home 202 susceptible to security issues. Various embodiments described herein address this and other issues.

Figure 3:
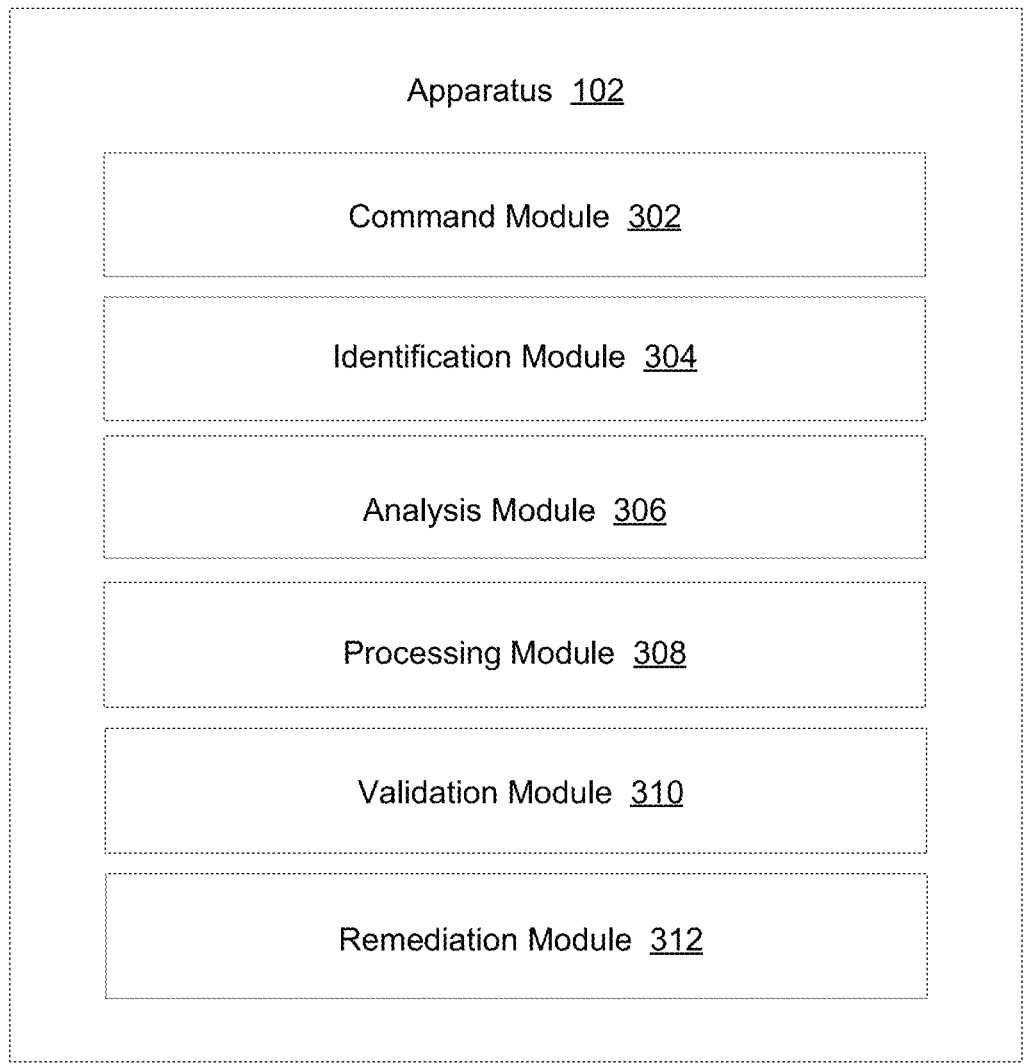
FIG. 3 is a block diagram of a representative apparatus in accordance with various embodiments.

Referring now to FIG. 3, in some embodiments, the apparatus 102 may include one or more modules configured to protect electronic devices from unauthorized audio commands. In some embodiments, for example, the apparatus 102 may include a command module 302, an identification module 304, an analysis module 306, a processing module 308, a validation module 310, and/or a remediation module 312.

In some embodiments, the command module 302 may be configured to receive an audio command from a user. In some embodiments, the apparatus 102 may include one or more input devices 110 such as a microphone configured to receive audio input from a surrounding environment. Thus, in some embodiments, the microphone or other suitable input device 110 may receive the audio command. In some embodiments, the command module 302 may be further configured to convert the audio input to audio signals. For example, in certain embodiments, the input device 110 may include one or more digital microphones. In some embodiments, the digital microphone may include a multi-directional microphone. The multi-directional microphone may include a beamforming microphone to provide directional sound transmission and/or reception. In one embodiment, the multi-directional microphone may be a micro-electro-mechanical systems (MEMS) microphone.

In some embodiments, the identification module 304 may be configured to receive and analyze the sound input and/or audio signals to identify the audio command as a sensitive command. In some embodiments, the identification module 304 may be configured by the manufacturer of the apparatus 102 to define certain audio commands (e.g., open the garage door, unlock the front door, unlock the window, etc.) as sensitive commands. In these and other embodiments, a sensitive command may be defined to include commands that, if performed, would enable the user to access the home 202 and/or control equipment or features disposed within the interior environment 206 of the home 202. For example, in some embodiments, sensitive commands may include instructions to turn on or off lights, operate an appliance, adjust a climate setting, and/or otherwise access or control interior features of the home 202. In these and other embodiments, sensitive commands may further include commands that would enable the user to access and/or modify security settings, change passcodes, add or change authorized users, or the like.

In some embodiments, the identification module 304 may be configured to utilize a learning model such as an artificial intelligence model, a machine-learning model, or any other suitable model, to identify the audio command as a sensitive command. As discussed above, in some embodiments, sensitive commands may include "unlock door," "open garage door," "turn on stovetop," or other similar commands. In some embodiments, non-sensitive commands may include "turn up volume," "set timer," "play music," or the like. In some embodiments, the learning model may be trained to recognize a sensitive command by inputting both sensitive and non-sensitive commands into deep neural networks or other deep learning architectures that use algorithms to identify patterns in the commands. In this manner, embodiments of the invention may recognize sensitive commands and, in some embodiments, may correlate sensitive commands with other data.

In some embodiments, the analysis module 306 may be configured to perform a spectral analysis of the sensitive command. In some embodiments, the spectral analysis may be performed by the apparatus 102. In other embodiments, the spectral analysis may be performed by a remote server 118, a mobile device 122 such as a cellular phone, a workstation or personal computer 120, and/or any other suitable electronic device in communication with the apparatus 102 via a wired or wireless connection. In some embodiments, performance of the spectral analysis may be distributed across more than one server and/or electronic device. In some embodiments, the analysis module 306 may receive and analyze sound input and/or audio signals corresponding to the sensitive command to create a spectral plot or Bode plot (as depicted by FIGS. 4, 5, and 8-11). In some embodiments, the spectral plot may include the overall frequency magnitude and amplitude or gain reduction of the sensitive command. In some embodiments, the spectral plot may include a horizontal axis describing frequency, e.g., in a logarithmic (Hz) scale, and one or more vertical axes describing gain or amplitude, e.g., in a decibel (dB) scale.

In some embodiments, the analysis module 306 may apply a filter such as a bandpass filter, a band-stop filter, a notch filter, or other suitable filter to the spectral analysis to allow audio signals within a selected range of frequencies and/or amplitudes to be analyzed, while preventing audio signals at unwanted frequencies and/or amplitudes from being considered. For example, in one embodiment, the analysis module 306 may apply a filter to the spectral analysis that targets frequencies and/or amplitudes corresponding to audio input obstructed by a substrate such as a door, a wall, glass, or the like.

In some embodiments, the processing module 308 may assign a spectral analysis score to the sensitive command based on the spectral plot. In some embodiments, the spectral analysis score may reflect an average frequency magnitude or gain reduction of the sensitive command. In some embodiments, the score may reflect a percentage or concentration of total audio signals that are disposed within a filter applied to the spectral plot. In some embodiments, the processing module 308 may augment the spectral analysis score based on a length of time associated with the audio input and/or audio signals, for example.

In some embodiments, the spectral analysis score may be a numerical score in a range between one (1) and one hundred (100). In other embodiments, the spectral analysis score may be a numerical score in a range between zero (0) and one (1), or in a range between one (1) and ten (10). Of course, the spectral analysis score may include a numerical score in any suitable range. In other embodiments, the spectral analysis score may include a designation such as pass or fail, or positive or negative. In some embodiments, the designation may indicate a position on a sliding scale. In some embodiments, the spectral analysis score may include a combination of a numerical score and one or more additional designations, and/or may include any other suitable designation, value, or combination thereof known to those in the art.

In some embodiments, the processing module 308 may process, via a learning model, the spectral analysis and/or the spectral analysis score. In various embodiments, the processing module 308 may evaluate specific frequencies of the audio command to determine whether or not the audio command was obstructed and thus likely originated from an exterior environment 204. In some embodiments, the processing module 308 may evaluate the frequencies via the learning model. In other embodiments, the processing module 308 may evaluate the frequencies at least partly independent of the learning model.

In some embodiments, the sensitive command may be obstructed as a result of being transmitted through a door, wall, window, a combination thereof, or the like. In some embodiments, the processing module 308 may input both obstructed and unobstructed voice command data into deep neural networks or similar deep learning architectures to train the learning model. In addition, in some embodiments, the processing module 308 may process the audio input data and/or audio signal data via the learning model to distinguish obstructed audio commands from unobstructed (e.g., clear) audio commands.

In some embodiments, the processing module 308 may compare the spectral analysis score to one or more scores or ranges of scores provided by the learning model. If the spectral analysis score does not satisfy the learning model score or range of scores, the processing module 308 may identify the sensitive command as unobstructed and may associate the sensitive command with an interior environment 206 of the home 202. If, on the other hand, the spectral analysis score satisfies the learning model score or range of scores, the processing module 308 may identify the sensitive command as obstructed, meaning that the sensitive command was likely transmitted through an obstruction or barrier such a door, window, or wall. An obstructed sensitive command thus implies that the sensitive command originated from an exterior environment 204 outside of the home 202.

In the event the processing module 308 determines that the sensitive command is obstructed, the validation module 310 may be configured to perform one or more verification steps to verify that the sensitive command is unauthorized. For example, in some embodiments, the validation module 310 may query an authorized user, such as the homeowner, for verification information such as a pin number, a passcode, and/or any other suitable verification information. In these and other embodiments, the validation module 310 may prompt the authorized user for biometric verification data such as a face ID, a fingerprint, a voice ID, and/or any other suitable biometric data.

The verification information and/or biometric verification data provided by the user may be compared to one or more predetermined thresholds stored by or accessible by the apparatus 102. If the verification information and/or biometric verification data provided satisfies the predetermined threshold, the validation module 310 may be configured to deem the sensitive command valid. In some embodiments, the apparatus 102 may perform the sensitive command in response to the validation module 310 determining that the sensitive command is valid. If the verification information and/or biometric verification data provided by the user fails to satisfy a predetermined threshold, the validation module 310 may be configured to deem the sensitive command unauthorized.

In some embodiments, in response to the validation module 310 verifying that the sensitive command is unauthorized, the remediation module 312 may perform one or more remediation actions. For example, in some embodiments, the remediation module 312 may notify the authorized user or homeowner, a neighbor, and/or another designated person, activate a camera or other recording device, actuate a light source, actuate a locking mechanism, sound an alarm, and/or perform any other suitable remediation action.

Figure 4:
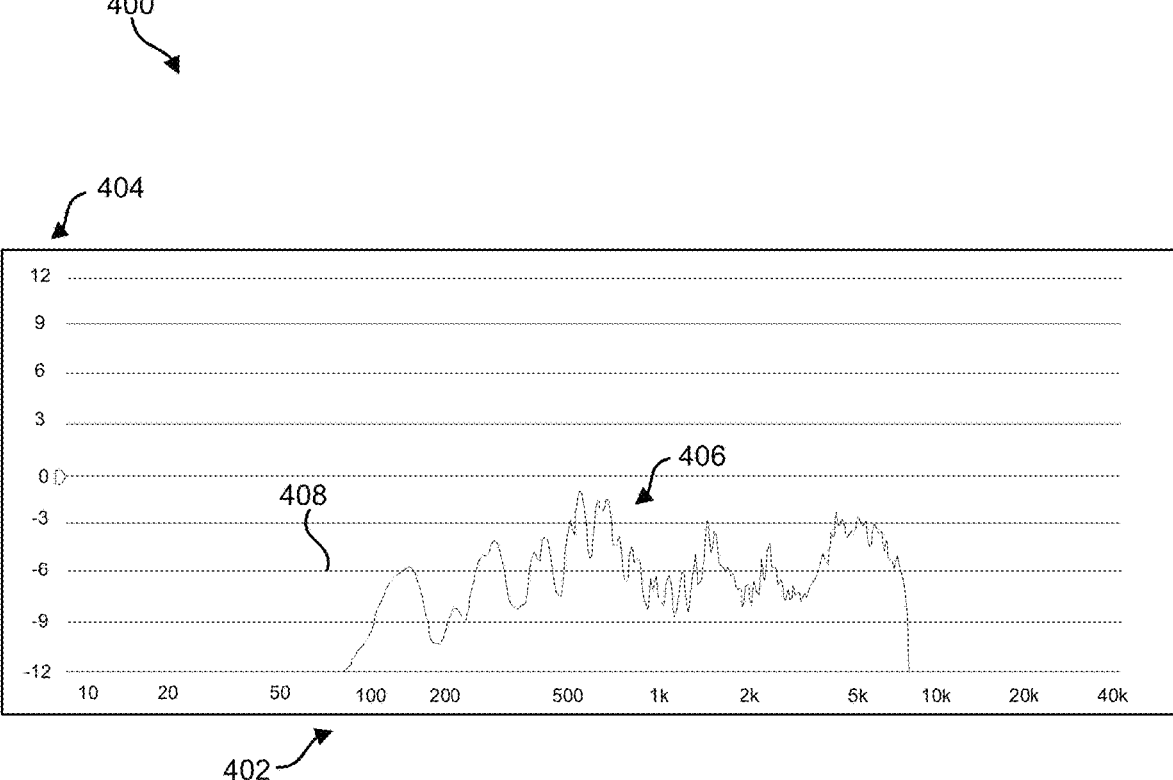
FIG. 4 is a spectral plot of a representative unobstructed audio command according to various embodiments.
Figure 5:
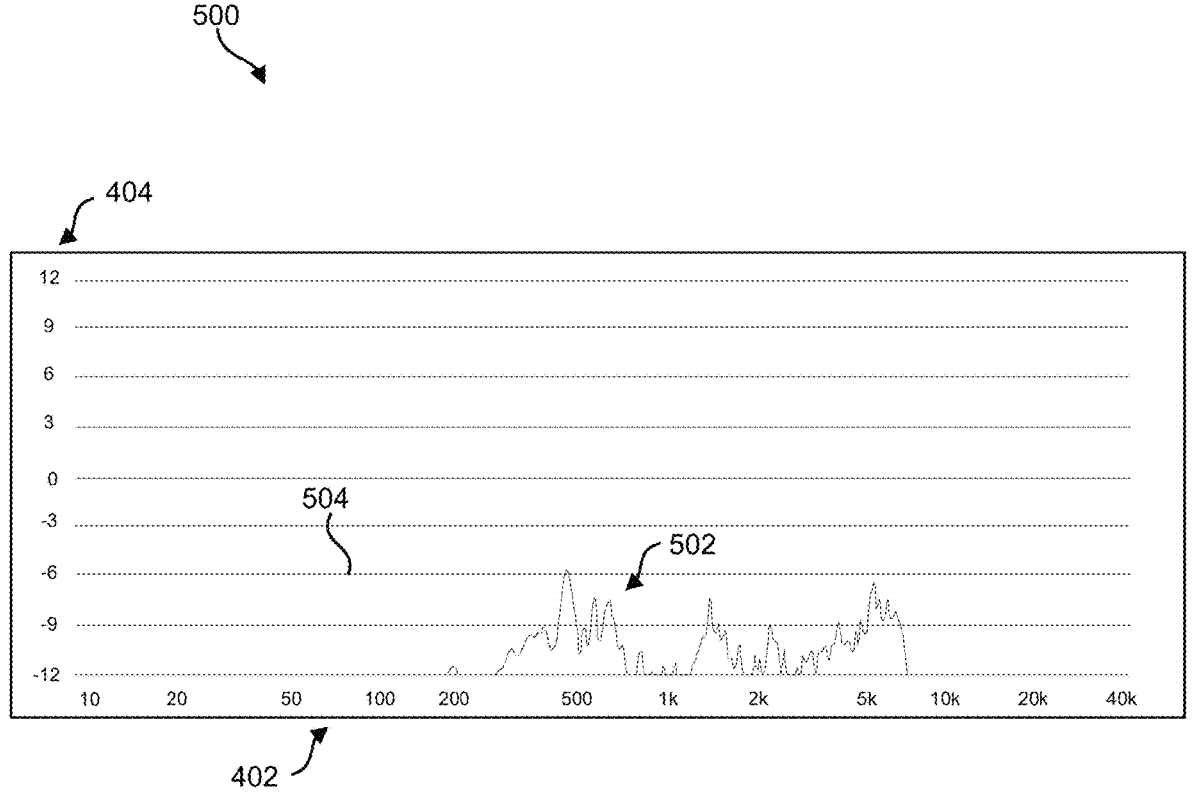
FIG. 5 is a spectral plot of a representative obstructed audio command in accordance with various embodiments.

Referring now to FIGS. 4 and 5, a spectral analysis in accordance with various embodiments may include a spectral plot 400, 500 that represents an audio command as a graph of frequencies 402 and amplitudes 404. In some embodiments, as shown, frequency 402 magnitude may be represented along the horizontal axis while amplitude 404, or gain reduction, may be represented along the vertical axis. In some embodiments, frequency 402 values may be displayed in hertz (Hz) while amplitude 404 values may be displayed in decibels (dB). Of course, spectral analysis values and/or spectral plot values may be displayed in any desired units of measurement. In certain embodiments, frequency 402 and/or amplitude 404 values may be displayed on a logarithmic scale, a linear scale, or any other suitable scale. In some embodiments, the spectral plot 300 may be created using a mathematical algorithm such as a Fast Fourier Transform ("FFT"), or by using any other suitable algorithm or method.

As shown in FIG. 4, in one embodiment, the spectral plot 400 may represent an unobstructed, or clean, audio command received by the apparatus 102. In these and other embodiments, the amplitude 404 values and corresponding frequencies 402 of the unobstructed audio command may provide baseline measurements 406 or ranges of values from which the apparatus 102 may be calibrated. In certain embodiments, the baseline measurements 406 may be used to define one or more spectral threshold values 408 or ranges of spectral threshold values 408 that a spectral plot 500 of a subject sensitive command must satisfy to be deemed valid. In some embodiments, the processing module 208 may deem a sensitive command unauthorized if its measured amplitude 404 and/or frequency 402 is abnormally high or low relative to the spectral threshold value 408 or ranges of values. In some embodiments, the baseline measurements 306 may include the spectral threshold value 308. For example, in one embodiment, as shown in FIGS. 4 and 5, the spectral threshold value 408 may include an amplitude 404 value of −6, or a range of spectral threshold values 308 between −12 and −6. Of course, the spectral threshold value 408 may include any suitable value or range of values known to those in the art.

Referring now to FIG. 5, in some embodiments, the processing module 308 may compare at least a portion of the baseline measurements 406 and/or spectral threshold value 408 to spectral plot measurements 502 of a subject sensitive command. In some embodiments, the processing module 308 may utilize this comparison to determine whether the sensitive command is obstructed or unobstructed.

In some embodiments, the baseline measurements 406 may be utilized to create a filter (e.g., bandpass filter, band-stop filter, notch filter) that may be applied to a spectral analysis or plot 500 of the sensitive command. For example, in some embodiments, the filter may include amplitude 404 values and frequency 402 values within a specified range of error based on the baseline measurements 406. In one embodiment, for example, the range of error may be defined as plus or minus three percent (3%) relative to the baseline measurements 406. In another embodiment, the range of error may be defined as plus or minus five percent (5%) relative to the baseline measurements 406. In still another embodiment, the range of error may be defined as plus or minus ten percent (10%) relative to the baseline measurements 406.

In this manner, in some embodiments, the filter may quickly identify portions of the spectral plot 500 of the sensitive command that fall within an acceptable range relative to the baseline measurements 406. In certain embodiments, where all or none of the spectral plot measurements 502 of the sensitive command fall within the filter for example, application of the filter may allow the processing module 308 to quickly determine that the sensitive command is either valid or unauthorized. In some embodiments, however, application of the filter may not render an obvious result. In these and other embodiments, the processing module 308 may apply the filter to the spectral plot 500 of the sensitive command to identify portions of the spectral plot 500 falling within an acceptable range.

In some embodiments, the processing module 308 may generate a spectral analysis score for the sensitive command based on an analysis of the portions of the spectral plot 500 falling within the range defined by the filter. In other embodiments, the processing module 308 may generate a spectral analysis score for the sensitive command based on an analysis of the entire spectral plot 500. In some embodiments, the processing module 308 may compare the spectral analysis score of the spectral plot 500 to a threshold score based on the one or more spectral threshold values 408 to determine whether the sensitive command is obstructed.

In some embodiments, the apparatus 102 may receive at least one spectral threshold value 408 from a remote server via a wired or wireless connection. In some embodiments, as discussed in more detail below, the spectral threshold values 408 may be pre-defined by the apparatus 102 manufacturer and/or may include values generated by a learning model. In these and other embodiments, the apparatus 102 may receive one or more updated spectral threshold values 408 from the remote server, e.g., on a periodic, intermittent, or continuous basis.

In some embodiments, the apparatus 102 may receive the one or more spectral threshold values 408 via a wireless connection such as a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada. In some embodiments, the wireless connection may employ 5G, LTE-M, NB-IoT, LoRaWAN, SigFox, or any other suitable wireless communication standard or protocol.

In some embodiments, the wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

In some embodiments, the processing module 308 may determine that the sensitive command is unauthorized in the event that the spectral analysis score does not satisfy the spectral threshold value 408. In certain embodiments, as discussed in more detail with reference to FIGS. 9-12 below, the spectral threshold value 408 may correspond to a resonant frequency of a barrier or structure such as a wall, a door, glass, a combination thereof, and/or any other suitable barrier or structure.

In some embodiments, the spectral plot 500 of the sensitive command may represent an obstructed audio command received by the apparatus 102. As previously described, in some embodiments, the audio command may be obstructed by a physical structure or barrier such as a door, window, wall, or the like. As a result, the obstruction may dampen certain frequencies 402 of the audio command. In one embodiment, for example, glass having a resonant frequency of 300 Hz may obstruct the audio command. As a result, an associated spectral analysis or spectral plot may fail to identify frequencies 402 of the obstructed audio command in a range between 300 Hz and 800 Hz. In this and other embodiments, the amplitude 404 and/or frequency 402 values of the sensitive command may be reduced relative to the baseline measurements 406 and/or spectral threshold value 408 or range of values. The processing module 308 may thus generate a spectral analysis score for the sensitive command that does not satisfy a threshold score based on the spectral threshold values 308.

Figure 6:
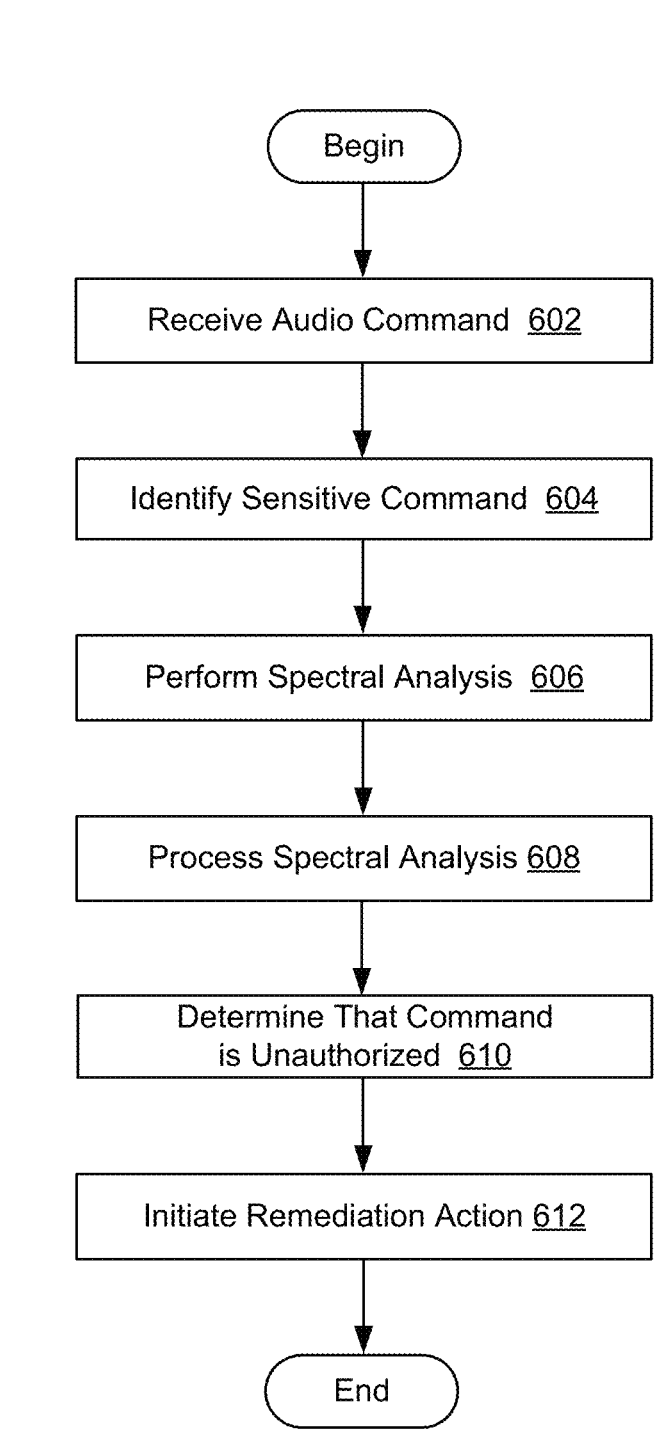
FIG. 6 is a flow chart of a representative method for protecting an electronic device from obstructed audio commands in accordance with the disclosure.

Referring now to FIG. 6 in some embodiments, a method 600 for protecting electronic devices from obstructed audio commands may include receiving 602, by an electronic device, an audio command and identifying 604 the audio command as a sensitive command. In some embodiments, the electronic device may perform 606 a spectral analysis of the sensitive command. In other embodiments, the spectral analysis may be performed 606 by a remote server 118, a mobile device 122 such as a cellular phone, a workstation or personal computer 120, and/or any other suitable electronic device in communication with the apparatus 102 via a wired or wireless connection. In some embodiments, performance of the spectral analysis may be distributed across more than one server and/or electronic device. The spectral analysis may be processed 608, via a learning model, to determine whether the sensitive command is obstructed. In some embodiments, the method 600 may determine 610, in response to the sensitive command being obstructed, that the sensitive command is unauthorized. At least one remediation action may be initiated 612 in response.

Figure 7:
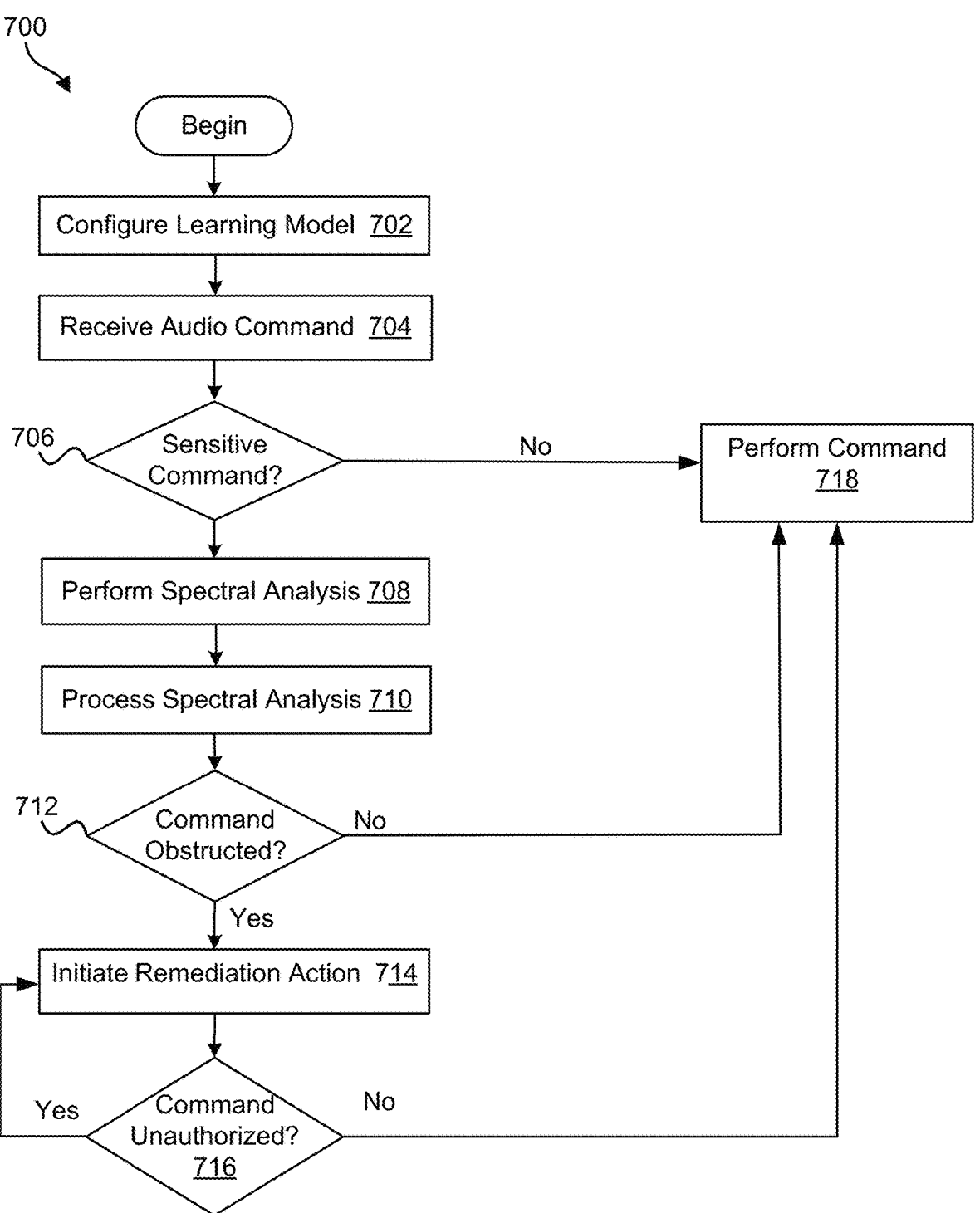
FIG. 7 is a flow chart of another representative method for protecting an electronic device from obstructed audio commands in accordance with the disclosure.

Referring now to FIG. 7, in some embodiments, a method 700 for protecting electronic devices from obstructed audio commands may include configuring 702 the learning model. In some embodiments, configuring 702 the learning model may include training the learning model using at least one spectral threshold value 408 corresponding to an obstructed command. In some embodiments, the obstructed command may originate from the exterior environment 204. In some embodiments, the learning model may receive the spectral threshold value 408 from a remote server.

In some embodiments, configuring 702 the learning model may further include receiving at least one updated spectral threshold value 408 from the remote server for further training. In certain embodiments, the spectral threshold value 408 may correspond to a resonant frequency of a wall, a door, glass, a combination thereof, and/or any other barrier or structure providing a boundary or obstruction between the interior environment 206 of the home 202 and the exterior environment 204. In certain embodiments, the spectral threshold value 408 may correspond to an expected frequency response when an audio command is issued through a wall, a door, glass, a combination thereof, and/or another barrier or structure obstructing the interior environment 206 of the home 202 and the exterior environment 204.

In some embodiments, the method 700 may further include receiving 704, by the electronic device, an audio command. In some embodiments, the method 700 may include determining 706 whether the audio command is a sensitive command. In some embodiments, the apparatus 102 may be configured by the manufacturer to define certain audio commands as sensitive commands. In other embodiments, the apparatus 102 may be configured to utilize a learning model to identify certain audio commands as sensitive commands. In either case, sensitive commands may include commands that would enable the user to control access to the home 202 and/or to control equipment or features disposed within the interior environment 206 of the home 202. If the audio command received is identified as a non-sensitive command, the apparatus 102 may perform 718 the command. Alternatively, if the audio command received is identified 706 as a sensitive command, the method 700 may proceed to performing 708 a spectral analysis of the sensitive command.

In some embodiments, performing 708 the spectral analysis may include generating a spectral plot of the sensitive command. In some embodiments, the spectral plot may include the overall frequency 402 magnitude and amplitude 404 or gain reduction of the audio input and/or corresponding audio signals. In some embodiments, a bandpass filter or other suitable filter may be applied to the spectral analysis to identify audio signals within a selected range of frequencies 402 and/or amplitudes 404 for further analysis and/or processing.

In some embodiments, the method 700 for protecting electronic devices from obstructed voice commands may include processing 710 the spectral analysis to assign a spectral analysis score to the spectral plot, for example. In some embodiments, the spectral analysis score may reflect an average frequency 402 magnitude or amplitude 404 of the spectral plot. In some embodiments, the spectral analysis score may reflect a percentage or concentration of total audio signals disposed within an applied filter. In some embodiments, the spectral analysis score may include a numerical score in any suitable range. In other embodiments, the spectral analysis score may include any other suitable designation, value, or combination thereof known to those in the art.

In some embodiments, processing 710 the spectral analysis may include utilizing a learning model to determine whether the sensitive command is obstructed. In some embodiments, the learning model may input both obstructed and unobstructed voice command data into deep neural networks or similar deep learning architectures. These architectures may enable the learning model to distinguish obstructed audio commands from unobstructed audio commands. In some embodiments, processing 710 the spectral analysis may include inputting data from the spectral analysis into the learning model to determine whether the sensitive command is obstructed or unobstructed. In some embodiments, a bandpass filter, band-stop filter, band-rejection filter, notch filter, or other suitable filter may be applied to the spectral analysis to determine whether the sensitive command is obstructed.

In some embodiments, processing 710 the spectral analysis may include comparing the spectral analysis score to a threshold score stored by the apparatus 102. In some embodiments, the threshold score may be received from a remote server. In other embodiments, the threshold score may be generated by the apparatus 102 based on one or more spectral threshold values 308. In certain embodiments, the threshold score may be based on spectral threshold values 308 and/or other data received by the learning model. If the spectral analysis score does not satisfy the threshold score, the sensitive command may be determined to be unobstructed. Alternatively, the sensitive command may be determined to be obstructed.

In some embodiments, the method 700 may query 712 whether the sensitive command is obstructed. If no, the method 700 may perform 718 the sensitive command. If yes, the method 700 may initiate 714 one or more remediation actions. In some embodiments, initiating 714 a remediation action may include verifying 716 that the sensitive command is unauthorized. In some embodiments, verifying 716 that the sensitive command is unauthorized may include querying an authorized user for verification information such as a pin number, a passcode, biometric information, and/or any other suitable verification information.

If the sensitive command has not been verified as unauthorized, the method 700 may proceed to performing 718 the command. If the sensitive command has been confirmed as unauthorized, the method 700 may return to initiating 714 one or more remediation actions. In these and other embodiments, initiating 714 the remediation action may include notifying a user, activating a recording device, actuating a light source, actuating a locking mechanism, sounding an alarm, a combination thereof, and/or performing any other suitable remediation action.

Figure 8:
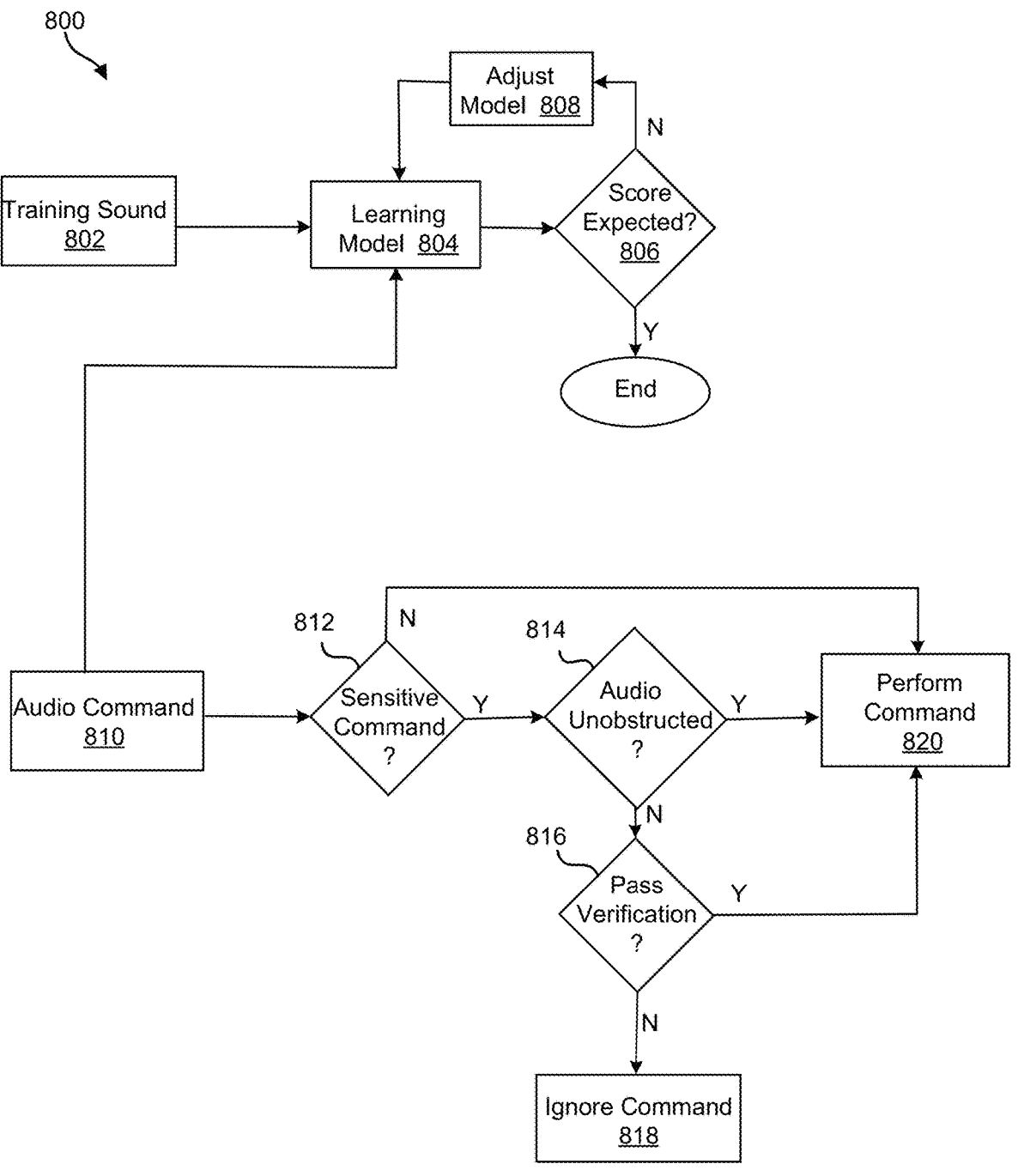
FIG. 8 is a schematic diagram of a representative method for training a learning model in accordance with the disclosure.

Referring now to FIG. 8, a method 800 for training a learning model 804 in accordance with some embodiments may include providing a training sound 802 to the learning model 804. In some embodiments, the training sound 802 may include a spectral analysis and/or spectral analysis score for the training sound 802. In some embodiments, the training sound 802, spectral analysis, and/or spectral analysis score may include at least one spectral threshold value 408 and/or a threshold score based on the at least one spectral threshold value 408. In some embodiments, the spectral threshold value 408 may correspond to a resonant frequency of a structure or barrier obstructing an interior environment 206 of a home 202 from an exterior environment 204 of the home 202. For example, in some embodiments, the spectral threshold value 408 may correspond to a resonant frequency of a wall, a door, a window, glass, a combination thereof, or the like.

In some embodiments, the training sound 802 may be automatically received by the learning model 804 from a remote server. Similarly, in some embodiments, the learning model 804 may receive one or more updates to the training sound 802, spectral analysis, spectral analysis score, spectral threshold value 808, and/or spectral threshold score via the remote server. In some embodiments, the remote server may transmit the training sound 802, spectral analysis, spectral analysis score, spectral threshold value 808, and/or spectral threshold score to the learning model 804 via a wired or wireless network.

In some embodiments, the learning model 804 may input the training sound 802, spectral analysis, spectral analysis score, spectral threshold value 408, and/or spectral threshold score into deep neural networks or other deep learning architectures that use algorithms or programs to identify patterns. In this manner, embodiments of the invention may utilize the training sound 802 and associated data to calibrate the apparatus 102.

In some embodiments, an audio command 810 received from a user during operation of the apparatus 102 may also be received by the learning model 804 and may be input into the deep neural networks or other deep learning architectures. In some embodiments, the audio command 810 and/or associated data may be analyzed by the learning model 804 and a spectral analysis score may be generated. In some embodiments, the spectral analysis score may be compared 806 to the threshold score. If the spectral analysis score does not satisfy the threshold score but the audio command 810 is determined to be valid, the learning model 804 may be adjusted 808 to reflect the data and/or results. For example, if both the learning model 804 and the apparatus 102 determine that the audio command 810 obstructed but the finding that the audio command 810 is unauthorized fails the verification step, the data associated with the audio command 810 may be used as a basis for adjusting 808 the learning model 804. In this manner, in some embodiments, the learning model 804 may be trained on a regular or continuous basis with received data to increase apparatus 102 reliability.

In operation, the audio command 810 may be received by the apparatus 102 via one or more microphones or other I/O devices 110. The apparatus 102 may then determine 812 whether the audio command 810 is a sensitive command. If not, the apparatus 102 may perform 820 the command. If yes, the apparatus 102 may determine 814 whether the audio command 810 is obstructed. If the audio command 810 is unobstructed, the apparatus 102 may perform 820 the command. If the audio command 810 is obstructed, the apparatus 102 may perform a verification step to verify 816 that the audio command 810 is unauthorized. If the audio command 810 passes the verification step, meaning that the audio command 810 is determined to be authorized, then the apparatus 102 may perform 820 the command. If the audio command 810 does not pass the verification step, meaning that the audio command 810 is verified to be unauthorized, then the apparatus 102 may ignore 818 the audio command 810.

Figure 9:
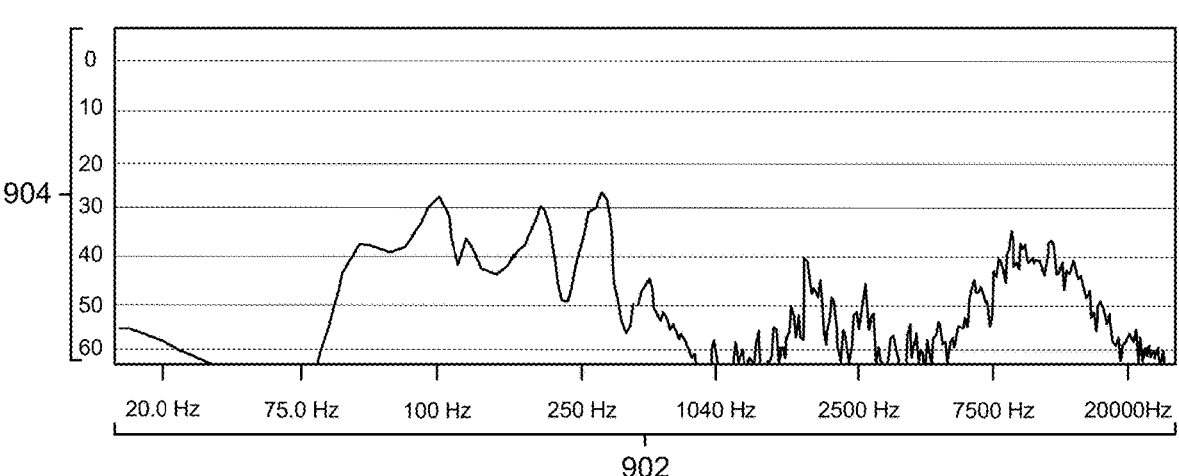
FIG. 9 is a spectral plot of another embodiment of an unobstructed audio command in accordance with the disclosure.

Referring now to FIGS. 9-12, in some embodiments, the learning model 804 may be trained by receiving one or more training sounds 802 and/or received audio commands 810. In some embodiments, each training sound 802 and/or received audio command 810 may include sound and associated data such as a spectral analysis or plot, one or more spectral threshold values 408, a threshold score, a spectral analysis score, and/or other suitable data. FIG. 9, for example, illustrates audio signals 900 corresponding to a representative unobstructed audio command 810. As shown, frequency 902 is represented along the horizontal axis in hertz (Hz) while amplitude 904, or gain reduction, is represented along the vertical axis in decibels (dB).

In some embodiments, the audio signals 900 and associated data may correspond to a command given by an authorized user, such as the homeowner. In certain embodiments, the learning model 804 may utilize the audio signals 900 and associated data to learn frequencies 902 associated with the authorized user's voice. In some embodiments, the apparatus 102 may identify an audio command 810 as a sensitive command if the corresponding frequencies 902 are outside of an expected range for the authorized user's voice.

Figure 10:
FIG. 10 is a spectral plot of the audio command of FIG. 9 obstructed by glass in accordance with various embodiments.
Figure 10:
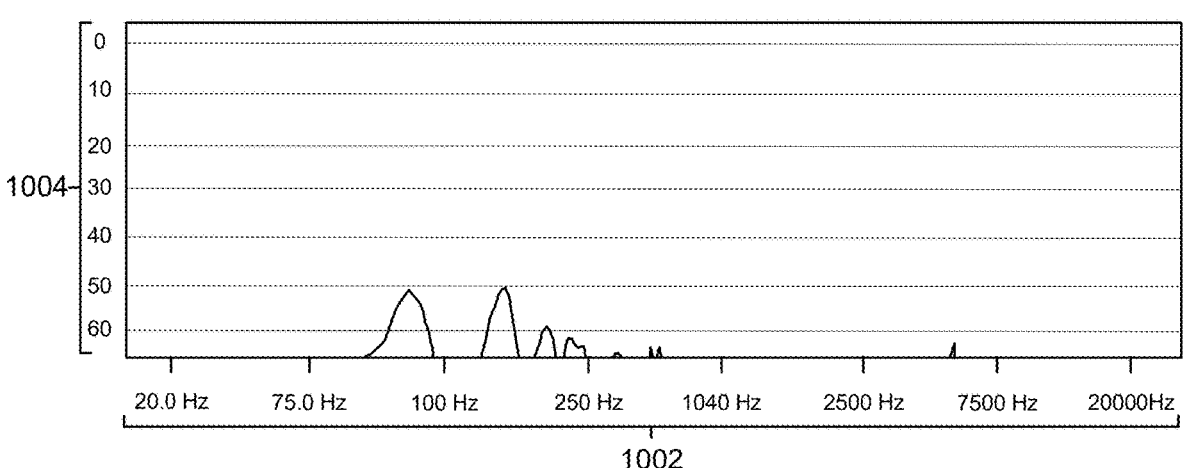
Figure 11:
FIG. 11 is a spectral plot of the audio command of FIG. 9 obstructed by a door in accordance with various embodiments.
Figure 11:
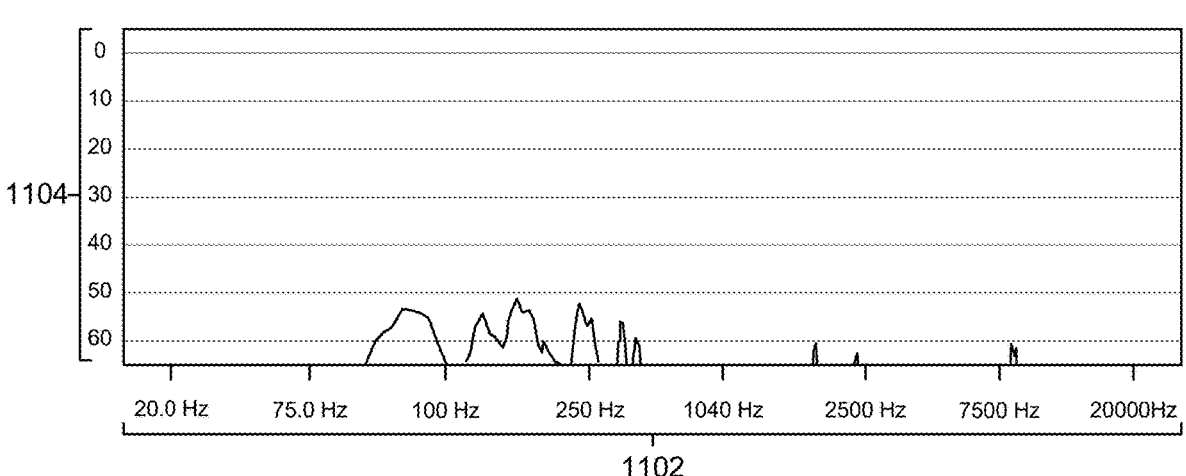
Figure 12:
FIG. 12 is a spectral plot of the audio command of FIG. 9 obstructed by a wall in accordance with various embodiments.
Figure 12:
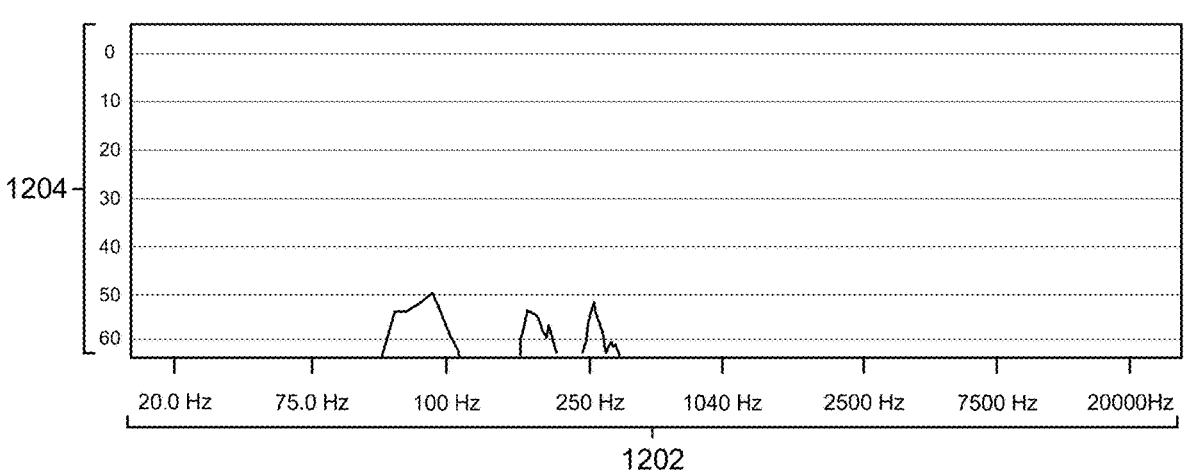

In some embodiments, the training sound 802 or audio command 810 may be associated with a structure or barrier through with the audio command 810 was transmitted. The structure or barrier may include any structure or material separating an interior of the home 202 from an exterior of the home 202, such as a door, a wall, a window, or the like. FIG. 10, for example, is a spectral plot 1000 illustrating audio signals corresponding to an audio command 810 transmitted through glass. Similarly, FIG. 11 is a spectral plot 1100 illustrating audio signals corresponding to an audio command 810 transmitted through a door, and FIG. 12 is a spectral plot 1200 illustrating audio signals corresponding to an audio command 810 transmitted through a wall.

In these and other embodiments, data associated with the training sound 802 or audio command 810, such as a spectral analysis, one or more spectral threshold values 408, and/or a threshold score based on the spectral threshold values 408, may reflect the resonant frequency of the structure or barrier, or the frequency at which the structure or barrier absorbs sound. In some embodiments, this data may be used to generate a filter to identify and isolate audio signals within a specified range for analysis.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

training, by a processor of an electronic device, a learning model based on obstructed voice command input data and unobstructed voice command input data to generate a trained learning model;

receiving, by the processor, an audio command;

identifying, by the processor, the audio command as a sensitive command;

performing, by the trained learning model, a spectral analysis of the sensitive command to determine whether the sensitive command is obstructed;

determining, by the trained learning model, that the sensitive command is unauthorized in response to the spectral analysis indicating that the sensitive command is obstructed; and initiating, by the processor, at least one remediation action in response to determining that the sensitive command is unauthorized, wherein initiating the at least one remediation action comprises one or more of notifying a user, activating a recording device, actuating a light source, actuating a locking mechanism, sounding an alarm, or a combination thereof.

2. The method of claim 1, further comprising configuring the learning model to include at least one spectral threshold value corresponding to an obstructed command.

3. The method of claim 2, wherein the at least one spectral threshold value corresponds to a resonant frequency of one or more of a wall, a door, glass, or a combination thereof.

4. The method of claim 2, wherein configuring the learning model comprises receiving, from a remote server, the at least one spectral threshold value.

5. The method of claim 2, wherein configuring the learning model further comprises generating a threshold score based on the at least one spectral threshold value.

6. The method of claim 1, wherein performing the spectral analysis comprises generating a spectral analysis score for the spectral analysis.

7. The method of claim 6, further comprising comparing the spectral analysis score to a threshold score based on at least one spectral threshold value.

8. The method of claim 7 wherein determining that the sensitive command is unauthorized comprises determining that the spectral analysis score does not satisfy the threshold score.

9. The method of claim 8, wherein determining that the sensitive command is unauthorized further comprises verifying the sensitive command via at least one of a passcode, a biometric signal, and an electronic signal.

10. The method of claim 1, wherein processing the spectral analysis comprises applying a filter to the spectral analysis.

11. An apparatus, comprising:

at least one processor; and at least one memory device coupled to the at least one processor, the at least one memory device comprising instructions executable by the at least one processor to cause the apparatus to:

train a learning model based on obstructed voice command input data and unobstructed voice command input data to generate a trained learning model;

receive an audio command;

identify the audio command as a sensitive command;

perform, by the trained learning model, a spectral analysis of the sensitive command to determine whether the sensitive command is obstructed;

determine, by the trained learning model, that the sensitive command is unauthorized in response to the spectral analysis indicating that the sensitive command is obstructed; and initiate at least one remediation action in response to determining that the sensitive command is unauthorized, wherein initiating the at least one remediation action comprises one or more of notifying a user, activating a recording device, actuating a light source, actuating a locking mechanism, sounding an alarm, or a combination thereof.

12. The apparatus of claim 11, wherein the instructions are further executable by the at least one processor to cause the apparatus to configure the learning model to include at least one spectral threshold value corresponding to an obstructed command.

13. The apparatus of claim 12, wherein the at least one spectral threshold value corresponds to a resonant frequency of one or more of a wall, a door, glass, or a combination thereof.

14. The apparatus of claim 11, wherein to process perform the spectral analysis, the instructions are further executable by the at least one processor to cause the apparatus to generate a spectral analysis score for the spectral analysis.

15. The apparatus of claim 14, wherein the instructions are further executable by the at least one processor to cause the apparatus to compare the spectral analysis score to a threshold score based on at least one spectral threshold value.

16. The apparatus of claim 11, wherein the instructions are further executable by the at least one processor to cause the apparatus to automatically receive, from a remote server, at least one spectral threshold value.

17. The apparatus of claim 11, wherein to determine whether the sensitive command is unauthorized, the instructions are further executable by the at least one processor to cause the apparatus to verify the sensitive command via one or more of a passcode, a biometric signal, an electronic signal, or a combination thereof.

18. A computer program product comprising a non-transitory computer readable storage medium storing code, the code being configured to be executable by a processor to perform operations comprising:

training, by the processor, a learning model based on obstructed voice command input data and unobstructed voice command input data to generate a trained learning model;

receiving an audio command;

identifying the audio command as a sensitive command;

performing, by the trained learning model, a spectral analysis of the sensitive command to determine whether the sensitive command is obstructed;

determining, by the trained learning model, that the sensitive command is unauthorized in response to the spectral analysis indicating that the sensitive command is obstructed; and initiating at least one remediation action in response to determining that the sensitive command is unauthorized, wherein initiating the at least one remediation action comprises one or more of notifying a user, activating a recording device, actuating a light source, actuating a locking mechanism, sounding an alarm, or a combination thereof.

19. The computer program product of claim 18, the operations further comprising configuring the learning model to include at least one spectral threshold value corresponding to an obstructed command.

20. The computer program product of claim 19, wherein the at least one spectral threshold value corresponds to a resonant frequency of one or more of a wall, a door, glass, or a combination thereof.

\* \* \* \* \*